(12) United States Patent
Kabir et al.

(10) Patent No.: US 10,706,206 B1
(45) Date of Patent: Jul. 7, 2020

(54) METHODS FOR LAYOUT DRIVEN SYNTHESIS OF TRANSMISSION LINE ROUTES IN INTEGRATED CIRCUITS

(71) Applicant: CADENCE DESIGN SYSTEMS, INC., San Jose, CA (US)

(72) Inventors: Sutirtha Kabir, Chandler, AZ (US);
Vishal Agarwal, Milpitas, CA (US);
Reenee Raizada Tayal, Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/220,948

(22) Filed: Dec. 14, 2018

(51) Int. Cl.
  *G06F 30/398* (2020.01)
  *G06F 3/0482* (2013.01)
  *G06F 30/33* (2020.01)
  *G06F 111/20* (2020.01)

(52) U.S. Cl.
  CPC .......... *G06F 30/398* (2020.01); *G06F 3/0482* (2013.01); *G06F 30/33* (2020.01); *G06F 2111/20* (2020.01)

(58) Field of Classification Search
  CPC ............. G06F 17/5009; G06F 17/5036; G06F 17/504; G06F 17/505; G06F 17/5068; G06F 17/5077; G06F 17/5081; G06F 30/33; G06F 30/398; G06F 3/0482; G06F 2111/20
  USPC .......................... 716/106, 122, 126, 139, 110
  See application file for complete search history.

(56) References Cited

U.S. PATENT DOCUMENTS

2010/0115487 A1* 5/2010 Tripathi .............. G06F 17/5077
716/122

\* cited by examiner

*Primary Examiner* — Paul Dinh
(74) *Attorney, Agent, or Firm* — Foley & Lardner LLP

(57) ABSTRACT

A computer may generate a record of a template associated with a schematic design corresponding to an integrated circuit design. The template may have one or more instances corresponding to one or more initial parameters associated with a chain of one or more transmission line components of the integrated circuit design. The computer may then modify content of the chain of one or more transmission line components in a circuit layout corresponding to the schematic design within the maximum range limit of the one or more initial parameters. The computer may update the one or more instances according to modified contents of the one or more transmission line components in the circuit layout.

20 Claims, 12 Drawing Sheets

400

Generate template associated with schematic design of IC
402

↓

Modify circuit layout corresponding to schematic design
404

↓

Update instances associated with template according to modifications in circuit layout 406

↓

Update schematic design of IC and initiate components of updated schematic design
408

METHODS FOR LAYOUT DRIVEN SYNTHESIS OF TRANSMISSION LINE ROUTES IN INTEGRATED CIRCUITS

TECHNICAL FIELD

This application relates generally to integrated circuits (ICs), and more specifically to methods and systems for layout driven synthesis of transmission line routes in the ICs.

BACKGROUND

Semiconductor based integrated circuits (ICs) are complex and contain millions of circuit devices such as transistors and millions of interconnections between the circuit devices. Designing, testing, and verifying the functionality of complex circuits cannot be accomplished manually, and designers use computer based electronic design automation (EDA) tools for creating schematics, layouts, simulation, and verification of the complex ICs such as radio frequency (RF) circuits.

Conventionally, during the designing and testing phases of RF circuits, designers create schematic designs of RF circuits prior to creating corresponding layouts (also referred to as layout designs) of the RF circuits. When a schematic designer first creates a schematic design of an RF circuit, the schematic designer may use parameters determined by simulating the RF circuit without knowing the constraints for a corresponding layout design. For example, the schematic designer may not know if a corresponding layout design for the schematic design can even be generated. While the schematic design includes logical components and logical connections within the RF circuit, the corresponding layout design includes physical components and physical connections. The layout design therefore may have placement and/or routing constraints. For example, in a layout design, a layout designer has to consider whether floor space is available for a component or routing a connection and whether a connection can be routed in a straight line.

The conventional methods of designing and testing RF circuits may therefore include multiple and cumbersome iterations. A schematic designer generates a schematic design without the knowledge of physical constraints in a layout design. When a layout designer generates a layout design corresponding to the schematic design, the layout designer has to provide feedback to the schematic designer to generate a new schematic design accounting for the physical constraints. The new schematic design may again not be within the physical constraints or may generate other unforeseen physical design problems. Furthermore, based on the physical constraints, the schematic designer may have to modify impedance requirements. Therefore, it may take multiple iterations and a significant amount of time to achieve a schematic design and a corresponding layout design that are in sync with each other.

For example, a schematic designer may generate a straight transmission line between a point A and a point B in an RF circuit. A layout designer may encounter various blocks in the path of the straight transmission line. The layout designer may therefore have to change the configuration of the transmission line layout, e.g., introduce bends, to route around the blocks. The layout designer may then have to communicate the change in configuration to the schematic designer. The schematic designer may modify the transmission line in the schematic design to accommodate the change the layout configuration. In other words, the changes in the layout design of the transmission line may have to be communicated back multiple times to the schematic design of the transmission line.

SUMMARY

What is therefore desired are systems and methods for a layout driven flow for transmission line route synthesis. What is further desired are systems and methods that back-annotate edits to the layout components to the corresponding schematic components.

Embodiments disclosed herein attempt to solve problems associated with generating and editing an integrated circuit design. For example, in a conventional electronic design automation (EDA) system, when modifications are performed in a circuit layout of the integrated circuit design, a corresponding update is not propagated to a schematic design of the integrated circuit design. Typically a circuit designer has to manually perform a tedious and time-consuming process of updating the schematic design in view of the modifications in the circuit layout. The embodiments disclosed herein describe methods and systems of synchronizing editing of the circuit layout and the schematic design of the integrated circuit design to update and back-annotate the schematic design in response to any modifications in the circuit layout.

In an embodiment, a computer-implemented method comprises generating, by a computer in a database, a record of a template associated with a schematic design corresponding to an integrated circuit design, the template having one or more instances corresponding to one or more initial parameters associated with a chain of one or more transmission line components of the integrated circuit design, the one or more initial parameters having a maximum value limit; in response to one or more instructions received on a user interface, modifying, by the computer, content of a circuit layout corresponding to the schematic design within the maximum range limit of the one or more initial parameters; and updating, by the computer, the one or more instances in the template according to modified contents of the one or more transmission line components in the circuit layout.

In another embodiment, a system comprises one or more computers comprising a non-transitory machine-readable media configured to store design data of an integrated circuit design; at least one computer of the one or more computers coupled to the non-transitory machine-readable media storing the design data and comprising a processor configured to: generate a record of a template associated with a schematic design corresponding to the integrated circuit design, the template having one or more instances corresponding to one or more initial parameters associated with a chain of one or more transmission line components of the integrated circuit design, the one or more initial parameters having a maximum value limit; in response to one or more instructions received from a user interface, modify content of a circuit layout corresponding to the schematic design within the maximum range limit of the one or more initial parameters; and update the one or more instances in the template according to modified contents of the one or more transmission line components in the circuit layout.

BRIEF DESCRIPTION OF THE DRAWINGS

The accompanying drawings constitute a part of this specification and illustrate embodiments of the subject matter disclosed herein.

DETAILED DESCRIPTION

Figure 1A:
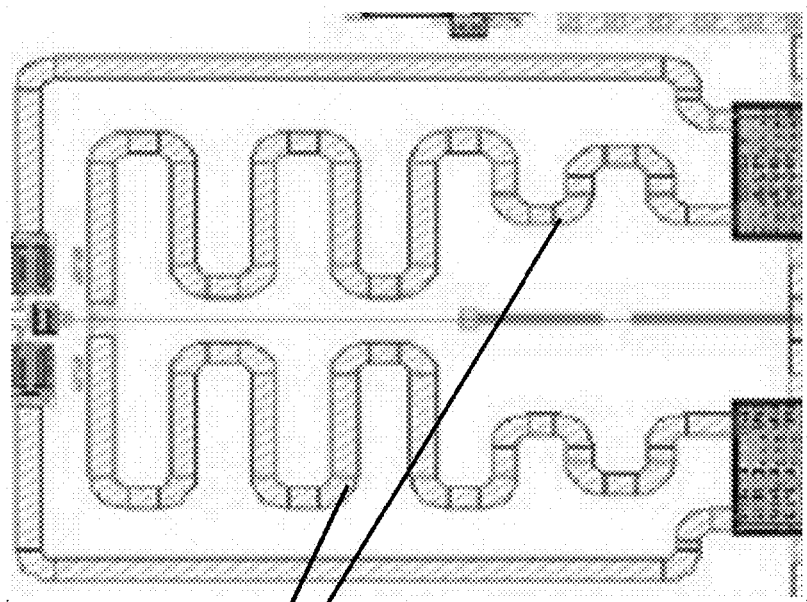
FIGS. 1A and 1B show illustrations of raw topologies of RF circuits.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Figure 1B:
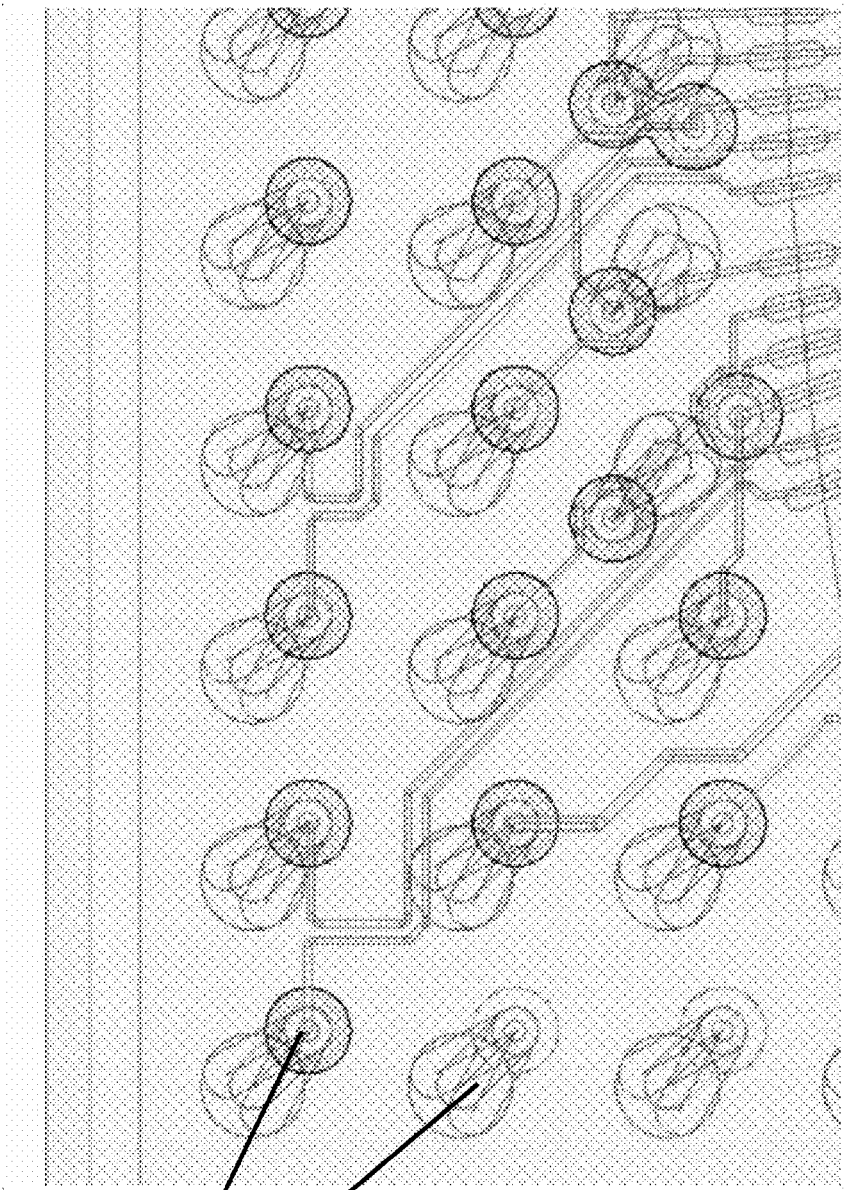

FIGS. 1A and 1B illustrate two examples of raw topologies 100, 102 of an electronic circuit such as a RF circuit. FIG. 1A shows serpentine structure topology 100 of the RF circuit showing various components 104 of the RF circuit. Upon analyzing a typical serpentine structure 102 of the RF circuit, a schematic designer cannot determine how various components 104 within the typical serpentine structure 102 of RF circuit are going to be routed, and thus the schematic designer is not able to describe a raw topology of the RF circuit shown in FIG. 1A in a schematic design using transmission line components. Similarly, for FIG. 1B, which is a raw topology 102 of the RF circuit showing various components 106, creating a transmission line structure in a schematic design driven flow of the RF circuit can be very time consuming using existing solutions/methodologies.

A topology 100 of a RF circuit may also represent a placement of critical electrical components 104 of the RF circuit. The electrical components 104 of the RF circuit may include transmission line components such as connectors, transmitters, and bends. The bends may connect two different transmission line components. While creating the schematic design of the RF circuit, the bends may have no physical meaning, and the bend may just represent a regular bend per se. But when the bends of the RF circuit are instituted in a circuit layout of the RF circuit, the bends may change parameters associated with the RF circuit because the physical bends may introduce other electrical characteristics. For example, when a schematic designer selects a length of 700 micron and a width of 200 micron between point A and point B in any RF circuit, if the topology 100 of the RF circuit is a straight structure, the schematic design of each component of the RF circuit may be valid. But because of a presence of the several bends in the topology 100 of the RF circuit, which may be bi-components introduced in the same transmission line, the bends may change effective length of the RF circuit as well as the impedance of the RF circuit. Therefore, upon creation of the circuit layout of the RF circuit, information associated with variations in parameters of the RF circuit that occurred because of the presence of the bends or other factors may have to be sent back to the schematic designer by the layout designer. The schematic designer may then analyze new information associated with the variations in the parameters of the RF circuit while performing a new simulation of updated RF circuit. The schematic designer has to consider the new information associated with the variations in the parameters of the RF circuit while performing a new simulation of updated RF circuit. For example, the schematic designer has to make use of each and every component of the RF circuit instituted in the circuit layout, but the schematic designer may be unable to do unless circuit layout has been created depicting each and every electrical and other component of the RF circuit. Additionally, an actual synthesis of the transmission line in the RF circuit depends on available space in the circuit layout, which cannot be driven from schematic design as the schematic designer does not have all information of the circuit layout while creating the schematic design.

Figure 2:
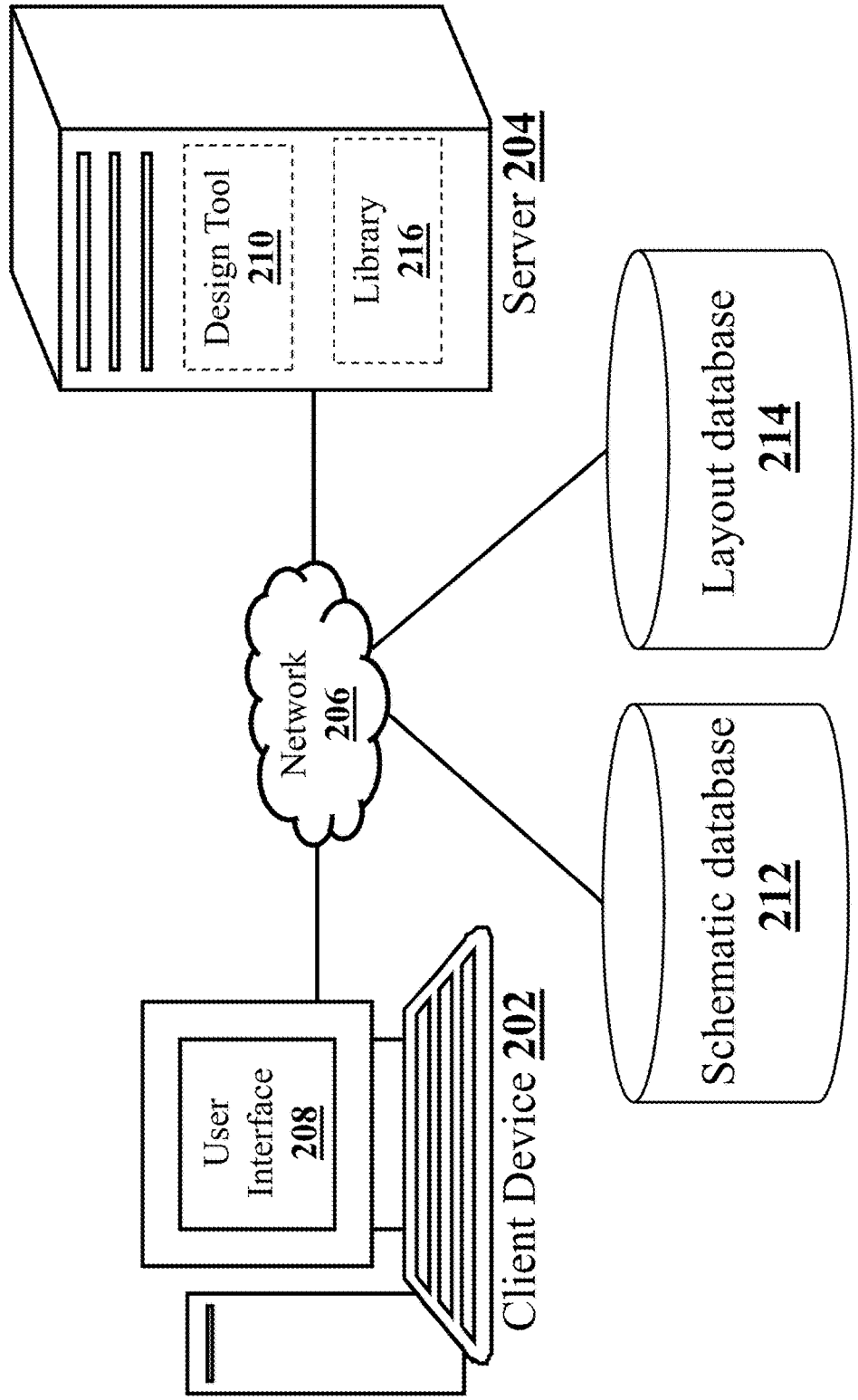
FIG. 2 illustrates various components of an electronic design automation (EDA) system, according to an embodiment.

FIG. 2 illustrates an electronic design automation (EDA) system 200 for an electronic circuit (e.g., an integrated circuit as shown FIGS. 1A and 1B). The EDA system 200 may include any number of computing devices and other circuit design devices. In some embodiments, the EDA system 200 may include one or more client devices 202 and one or more servers 204. One or more devices/components of the EDA system 200 may be grouped and referred to as an electronic design automation tool (or EDA tool). A client device 202 may be connected to a server 204 via hardware and software devices/components of one or more networks 206. The network 206 may refer to a medium that connects various components/devices and databases of the EDA system 200. The examples of the network 206 may include, but are not limited to, private or public LAN, WLAN, MAN, WAN, and the Internet. The network 206 may further include both wired and wireless communications according to one or more standards and/or via one or more transport mediums. The communication over the network 206 may be performed in accordance with various communication protocols such as Transmission Control Protocol and Internet Protocol (TCP/IP), User Datagram Protocol (UDP), and IEEE communication protocols. In one example, the network 206 may include wireless communications according to Bluetooth specification sets, or another standard or proprietary wireless communication protocol. In another example, the network 206 may include communications over a cellular network, including, e.g., a GSM (Global System for Mobile Communications), CDMA (Code Division Multiple Access), EDGE (Enhanced Data for Global Evolution) network.

A client device (also referred to as a client computing device) 202 may be a computing device, which may include a processor and/or computing components that performs one or more operations according to one or more programming instructions. Non-limiting examples of the client device 202 may include a desktop computer, a laptop, a personal digital assistant (PDA), a tablet computer, and the like. The EDA system 200 is shown in FIG. 2 as including only one client device 202 for ease of explanation, however, it should be appreciated that the EDA system 200 may include any number of client devices 202. In some embodiments, the EDA system 200 may include multiple interconnected, networked client devices 202, some of which may execute various software modules configured to manage and control the resources and performance of the EDA system 200. In some embodiments, the client devices 202 may have parallel architectures to support multi-threading on multi-core workstations to handle large designs. The client devices 202 may also be configured for distributed processing. The client devices 202 may be logically and physically organized within the same or different devices or structures, and may be distributed across any number of physical structures and locations.

The client device 202 may be capable of communicating with a server 204 through one or more networks 206 using wired or wireless communication capabilities, as described above. The client device 202 may execute various tasks and IC design processes described herein, such as generating, creating, displaying, updating, and receiving inputs from a circuit designer user interface 208 (such as inputs received from a user interface 208 of a schematic designer creating a schematic design of an IC and/or inputs received from a user interface 208 of a layout designer creating a layout design of the IC). The user interface 208 may receive instructions regarding IC schematic design and/or layout design creation process from a circuit designer such as the schematic designer and/or the layout designer. Schematic components for a schematic design may be stored in a database such as a schematic database 212. Layout components for a layout design may be stored in layout database 214. The databases 212, 214 may therefore enable design, creation and/or editing of a schematic design and/or a layout design of an IC.

A user interface 208 of a client device 202 may include a graphical user interface (GUI) that presents an interactive, graphical representation of a design as a schematic and/or a layout, or other logical representation of an IC that is being created, designed, optimized, simulated, and verified using a EDA tool such as a design tool 210. The user interface 208 may provide interactive elements, such as graphical representations of IC design elements for a user to create, manipulate, optimize, and/or verify the shown schematic and/or layout design. In some embodiments, the user interface 208 may include a text based interface allowing the user to enter manual commands for designing, optimizing, and verifying the schematic and/or layout design.

The client device 202 may have access to databases such as a schematic database 212 and/or a layout database 214. The schematic database 212 may store instances of IC schematics. The schematic database 212 may also include schematic design of the IC being created by a schematic designer. The layout database 214 may store examples of IC circuit layouts and pattern libraries. The layout database 214 may also include a circuit layout being created by a layout designer. One or more client devices 202 may be operated by a circuit designer (such as a schematic designer and/or a layout designer) to generate and/or execute instructions to access data within a schematic database 212 and/or a layout database 214 and/or transmit data within a schematic database 212 and/or a layout database 214. The schematic database 212 and/or the layout database 214, for example, stores IC design schematic designs, circuit layouts, layout rules, design rules, and pattern libraries. In some embodiments, the layout rules for the layouts are may be derived from design rules of a fabrication process. The layout rules may include limitations on IC design features, which may require adjustments to the features and shapes of various electrical components in the IC. In an example, the layout rules may include rules for the sizing and the spacing of the features in the IC such that compliance with the rules may require the addition, the removal, or the resizing of the shapes of the various electrical components of the IC. The layout rules may be defined using a programming language, such as but not limited to the SKILL language.

A server 204 may be a computing device, which may include a processor and a non-transitory machine-readable storage media capable of executing various tasks and processes described herein. The server 204 may be accessible to a client device 202 via one or more networks 206 using wired or wireless communication capabilities. The EDA system 200 is shown in FIG. 2 as including only one server 204 for ease of explanation, however, it should be appreciated that the EDA system 200 may include a number of servers 204. In some embodiments, the EDA system 200 may include multiple interconnected, networked servers 204, some of which may execute various software modules configured to manage and control the resources and performance of the EDA system 200. In some embodiments, the servers 204 may have parallel architectures configured to support multi-threading on multi-core workstations to handle large designs. In some embodiments, the servers 204 may be configured for distributed processing. The servers 204 may be logically and physically organized within the same or different devices or structures, and may be distributed across any number of physical structures and locations.

The server 204 may execute a design tool 210, and may include a memory (not shown) to store a software modules forming the design tool 210 (also referred to as design tool 210 software modules). An operating system software of the server 204 exposes services (e.g., graphics services, input/output services) through programming interfaces that can be used by the software modules of the design tool 210. The design tool 210 may provide a designer (such as schematic designer and/or a layout designer) with accurate and helpful information about the circuit design. For different stages in the design process of the IC, different design tools 210 use different design process techniques to create and present information about the IC design.

The server 204 may execute the design tool 210 software modules (e.g., an EDA design software) that may create, analyze, optimize, and verify an IC design. The design tool 210 may assist in executing instructions for creation and/or processing of the schematic design and circuit layout of the IC to identify various features and electrical components for creation and/or editing. A designer (such as a schematic designer and/or a layout designer) may interact with the design tool 210 through a number of input devices such as by inputting a selection as with a mouse or inputting a request as with a keyboard. The designer (such as a schematic designer and/or a layout designer) may observe a response to an access request on an output device or display. The design tool 210 may run in an application window controlled by a designer (such as a schematic designer and/or a layout designer). The design tool 210 may include a circuit designer interface, which may receive instructions regarding a schematic design of the IC or a circuit layout of the IC from a designer (such as a schematic designer and/or a layout designer). The design tool 210 may also utilize optimization processes and procedures stored in a memory device associated with the server 204 to enable optimization of the schematic design of the IC or the circuit layout of the IC, and execution of the IC design creation and/or editing process.

The server 204 may include a design library 216 that is accessed by a design tool 210. The design library 216 may include instances of various circuit devices, for example, transistors used to layout an IC. In some embodiments, the design library 216 may include instances of route cells and pcells used by the design tool 210 to generate a schematic design of the IC and a circuit layout of the IC. An instance of a route cell and/or a pcell may represent IC devices such as a transistor or a transmission line. The design tool 210 may use instances of the route cells and/or the pcells in the design library 216 to generate a netlist of an IC that can be sent to a manufacturing facility for fabrication.

A design tool 210 of the server 204 may include multiple software tools such as a schematic tool and a layout tool. The schematic tool may have access to data in the schematic database 212. The layout tool may have access to data in the layout database 214. The designer (such as a schematic designer and/or a layout designer) using one or more client devices 202 may operate and/or execute a schematic tool and/or a layout tool to enable creation and/or editing of a schematic design and/or a circuit layout of an IC. The designer (such as a schematic designer and/or a layout designer) may interact with the schematic tool and/or the layout tool through a number of input devices such as by inputting a selection as with a mouse or inputting a request as with a keyboard on their computing device. The designer (such as a schematic designer and/or a layout designer) may observe the response to the access request on an output device or display of their computing device.

In some embodiments, a client device 202 may receive instructions from a circuit designer (such as a schematic designer and/or a layout designer) to execute design tools 210 such as a schematic tool and a layout tool, which may have access to various databases. For instance, the client device 202 may execute the design tool 210 to access to various databases such as a schematic database 212 and a layout database 214 storing design instructions, circuit layouts, pattern libraries, netlist files, route cells, and/or templates. In some embodiments, multiple different client devices 202 may access multiple different or same databases via networks 206 and request access to objects such as schematic designs, circuit layouts, pattern libraries, netlist files, route cells, and/or templates stored therein. For example, using a first client device to access a schematic tool hosted on a server 202 over a network 206, a schematic designer may interact with the schematic tool, through a number of input devices of the first client device, such as by inputting a selection as with a mouse or inputting a request as with a keyboard. The schematic tool may generate any number of graphical interface responses based on the inputs received from the first client device, and then transmit the data back to the first client device to be rendered on GUI of the first client device. Similarly, using a second client device to access a layout tool hosted on a server 202 over a network 206, a layout designer may interact with the layout tool, through a number of input devices of the second client device, such as by inputting a selection as with a mouse or inputting a request as with a keyboard. The layout tool may generate any number of graphical interface responses based on the inputs received from the second client device, and then transmit the data back to the second client device to be rendered on GUI of the second client device.

In operation, a server 204 may execute one or more component software modules of a schematic tool software program and/or a layout tool software program, which may be software programs that allows circuit designers (such as a schematic designer and/or a layout designer) to design, create, optimize, and verify IC designs through one or more IC design software modules. The schematic tool and/or the layout tool may provide circuit designers with interactive user interfaces for creating an IC and various design elements, execute optimization processes, execute schematic-generation processes, execute layout-generation processes, and execute verification processes. The IC design may be an electronic circuit design, which may include digital logic elements. The examples of digital logic elements may include, but not limited to, AND gates, OR gates, NOT gates, NOR gates, NAND gates, XOR gates, XNOR gates, and/or combinational logic circuits, such as flip-flops, shift-registers, multiplexers and de-multiplexers. The examples of the IC design may further include a microcontroller unit (MCU), a system-on-chip (SOC), and an application specific integrated circuit (ASIC) design.

It should be understood that one or more operations described above with regards to FIG. 2 may be performed automatically. For instance and without limitation, the schematic tool and/or the layout tool may execute automated optimization processes, automated schematic-generation processes, and automated layout-generation processes.

Figure 3A:
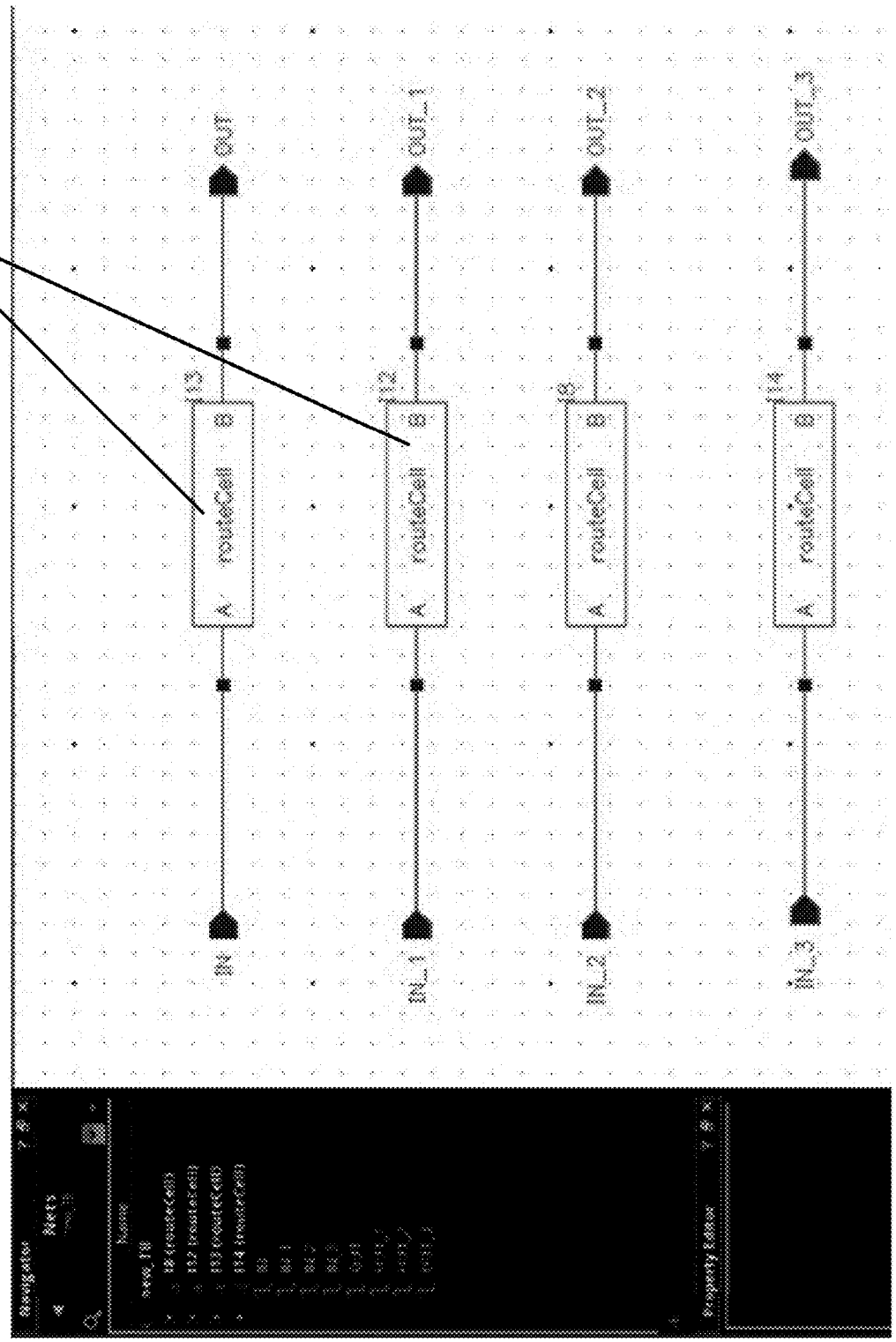
FIG. 3A is a screen display of a graphical user interface (GUI) illustrating a top level view of a schematic design with multiple route level instances of an electronic circuit design, according to an embodiment.

FIG. 3A is a screen display of a graphical user interface (GUI) 302 illustrating a top level view of a schematic design with multiple route level instances 318 of an electronic circuit design (or an integrated circuit (IC) design). Initially, during a design process of the electronic circuit, a schematic design of the electronic circuit is created. During creation of the schematic design of the electronic circuit, a schematic designer may execute a design tool software such as a schematic tool (or a schematic tool software) to generate and/or implement instructions and/or commands to create a template, which characterizes various connections between various locations in the electronic circuit such as a connection from point A to point B in the electronic circuit, but may not generate a complete topology of the electronic circuit.

A schematic tool (or schematic tool software) may be integrated into a CAD application of an EDA system or a schematic tool can be a standalone software application in an EDA system. The schematic tool may include one or more algorithms to interpret data from one or more electronic circuit netlists. The algorithms may be implemented to render the netlist data into useful and comprehensible schematics with readily identifiable analog circuit building blocks, which are laid out in a recognizable manner. The schematic tool may also include prototypes that contain recognized topologies that are user-programmable, which allows the schematic tool application to be customizable and extendable to more than a hard-coded software application.

The schematic tool may initiate a creation process of a schematic design of an electronic circuit by first gathering data from one or more netlists, which may come in a variety of formats, such as but not limited to SPICE (Simulation Program with Integrated Circuit Emphasis), CDL, Spectre, Verilog-A, Verilog-AMS, VHDL-AMS or other suitable formats. The schematic tool may work with one or more of the netlist formats. The format compatibility of the schematic tool may allow the schematic tool to be versatile. In this way, the schematic designer may import data from various types of netlist into the electronic circuit design. As mentioned, a netlist is a data file that contains information on electronic circuit elements and their connectivity.

Upon execution of a schematic tool, one or more templates called route cells 318 are created. The route cell 318 in a schematic design may be a parametrized cell (pcell), which allows creation of a customized instance of the pcell each time it is placed or used in an electronic circuit design. The route cell 318 may be a placeholder in a schematic design of the electronic circuit design to house a transmission line (TLine) schematic corresponding to a circuit layout transmission line route (TLine route). The TLine in a schematic design of the electronic circuit design is represented as symbols, and in a circuit layout of the electronic circuit design, the TLine is represented as physical geometries designed using fluid/non-fluid parametrized cell (PCell). The TLine route is a chain of TLine components to form a transmission line topology. A fluid transmission line route (Fluid TLine) is a TLine route that uses a concept of fluidity for route creation/editing with customized abutment behavior. Because the route cell 318 can be a pcell, each instance of the route cell 318 may store a different TLine route present in a circuit layout of the electronic circuit design.

Each route cell 318 may also represent a record of a particular circuit component capable of being logically placed onto an electronic circuit design, where each route cell 318 contains various types of information useful for designing schematic design of the electronic circuit design, such as the dimensions of the circuit component. The route cell 318 allows creation of a customized instance of the route cell 318 each time the route cell 318 is placed or used in the electronic circuit design. The route cell 318 may be flexible as compared to other cells representing circuitry because different instances of the route cell 318 may have different parameter values, whereas other cells may be more static, particularly for parameter values associated with the physical dimensions of the circuit components. For example, with a circuit component route cell 318, parameter values such as the length, width, and/or other design elements of the circuit component can be realized by inserting or changing one or more parameter values. Therefore, rather than have many different cell definitions to represent the variously sized circuit components in a given electronic circuit design, a single route cell 318 may take a circuit component's dimensions such as length and width as parameters. The different instances of the single route cell 318 can then represent circuit components of different sizes but otherwise having similar characteristics. However, different parameter values (such as length and width) of different instances of the route cell 318 may have maximum limits (also known as hard constraints). For example, a parameter value such as a length of a circuit component may have a maximum limit of 700 u, which indicates that the length of a circuit component cannot be stretched beyond 700 u. In another example, a parameter value such as a width of a circuit component may have a maximum limit of 100 u, which indicates that the width of a circuit component cannot be stretched beyond 100 u. In yet another example, a parameter value such as a length of a circuit component may have a maximum limit of 700 u and a parameter value such as a width of a circuit component may have a maximum limit of 100 u, which indicates that the length of a circuit component cannot be stretched beyond 700 u and the width of a circuit component cannot be stretched beyond 100 u. In some embodiments, a command corresponding to a value limit of different parameter values such as a length and a width of different instances of the route cell 318 may be made through a component of the EDA design tool or can be made through use of the application programming language of the EDA system.

In operation, a schematic designer may generates and/or execute commands/instructions on a design tool such as a schematic design tool to create one or more connections within a schematic design. For example, the schematic designer may generate four connections from one point location to another point location in a schematic design, such as from point locations 1 to 1', point locations 2 to 2', point locations 3 to 3', and point locations 4 to 4'. However, the schematic designer may not know how the four connections between point locations 1 to 1', point locations 2 to 2', point locations 3 to 3', and point locations 4 to 4' are going to be routed in a circuit layout (or layout design). The schematic designer may still have initial parameters associated with the four connections from one point location to another point location in an electronic circuit design (such as the connections between point locations 1 to 1', point locations 2 to 2', point locations 3 to 3', and point locations 4 to 4'). It should be understood that electronic circuit design may refer to the IC design associated with the schematic design and layout design described herein. In some embodiments, the design tool such as the schematic design tool may determine initial value of parameters associated with the four connections from one point location to another point location in an electronic circuit design (such as the connections between point locations 1 to 1', point locations 2 to 2', point locations 3 to 3', and points location 4 to 4') in the electronic circuit design based on analysis of results of initial simulation of the electronic circuit design. The design tool such as the schematic design tool may then assign the values of the initial parameters on one or more route cells 318. The design tool such as the schematic design tool may then transmit values of the initial parameters stored within the route cells 318 to a graphical user interface (GUI) of device of a layout designer, which the layout designer may use as an input to create a circuit layout of the electronic circuit design.

A route cell 318 may exist at different levels, namely, super master, sub master, and route cell instance. The route cell super master component is at a top level, with each of the different route cell sub master(s) representing different route cell instances of the route cell 318 used by a schematic designer. The schematic designer may execute instructions on a design tool such as schematic tool to create any number of super masters, sub masters, and instances in any given route cell 318. The route cell supermaster is a type of the route cell 318 that is encoded in a computer readable device and that is associated with a list of parameters, parameter types, parameter default values, and logic in a form of a computer program code. The schematic designer may execute instructions on a design tool such as schematic tool to specify values of its parameters for the route cell super master. In some embodiments, a design tool uses the logic of the route cell super master to generate one or more cells referred to as the route cell sub masters that complies with the user-specified parameter values based on initial simulation results of the electronic circuit design. The route cell sub master(s) is created by evaluating route cell code associated with the route cell super master for a given unique set of parameter values determined based on initial simulation results of the electronic circuit design. The route cell sub masters may be created in-memory such as volatile memory on demand for each unique set of parameters associated with instances in the open electronic circuit design. The route cell sub master(s), which receives properties from the associated route cell super master resides in virtual memory and not disk, and contains unique geometries produced by a unique set of parameter values.

In some embodiments, a schematic designer may use a design tool such as a schematic design tool having a schematic editor to create a route cell sub master(s) content using schematic creation/editing techniques, as applied to an existing route cell supermaster. The schematic designer may invoke an edit command on selected instance(s) at a top level, and then directly edit one or more displayed shapes that are inside the route cell sub master(s) while in the context of the top level.

In some embodiments, a route cell sub master(s) may be created without evaluating a route cell code, and by editing existing route cell sub master(s), and then binding the route cell sub master(s) to selected instances of an original route cell sub master(s). In such a case, a circuit designer such as a schematic designer can make manual edits of a route cell sub master(s) content manually through a graphical user interface (GUI) a computing device. In some embodiments, edits of a route cell sub master(s) content may be made through a component of an EDA tool. In some embodiments, edits of a route cell sub master(s) content may be made through use of an application programming language of the EDA system. The actual shapes that may include a route cell sub master(s) may be created by a function associated with a route cell usually written in a programming language, such as but not limited to the SKILL language.

An EDA layout platform may be built on a database. The database may provide interoperability support between electronic design tools. The database may further impose some changes on the design data such that the design data is more compact and easier to comprehend by multiple electronic design tools. The edits to the route cells update the route cell programming language code, which then manipulates parameters on the route cell instances.

The route cell instance(s) which inherit parameters and content from an associated route cell sub master(s) by means of being bound to said route cell sub master(s) may reside in a virtual memory. The route cell instance(s) may be associated with a set of parameter values determined based on an initial simulation results of an electronic circuit design, and each group of the route cell instance(s) which have the same parameter values may all bind to the same route cell sub master(s).

Figure 3B:
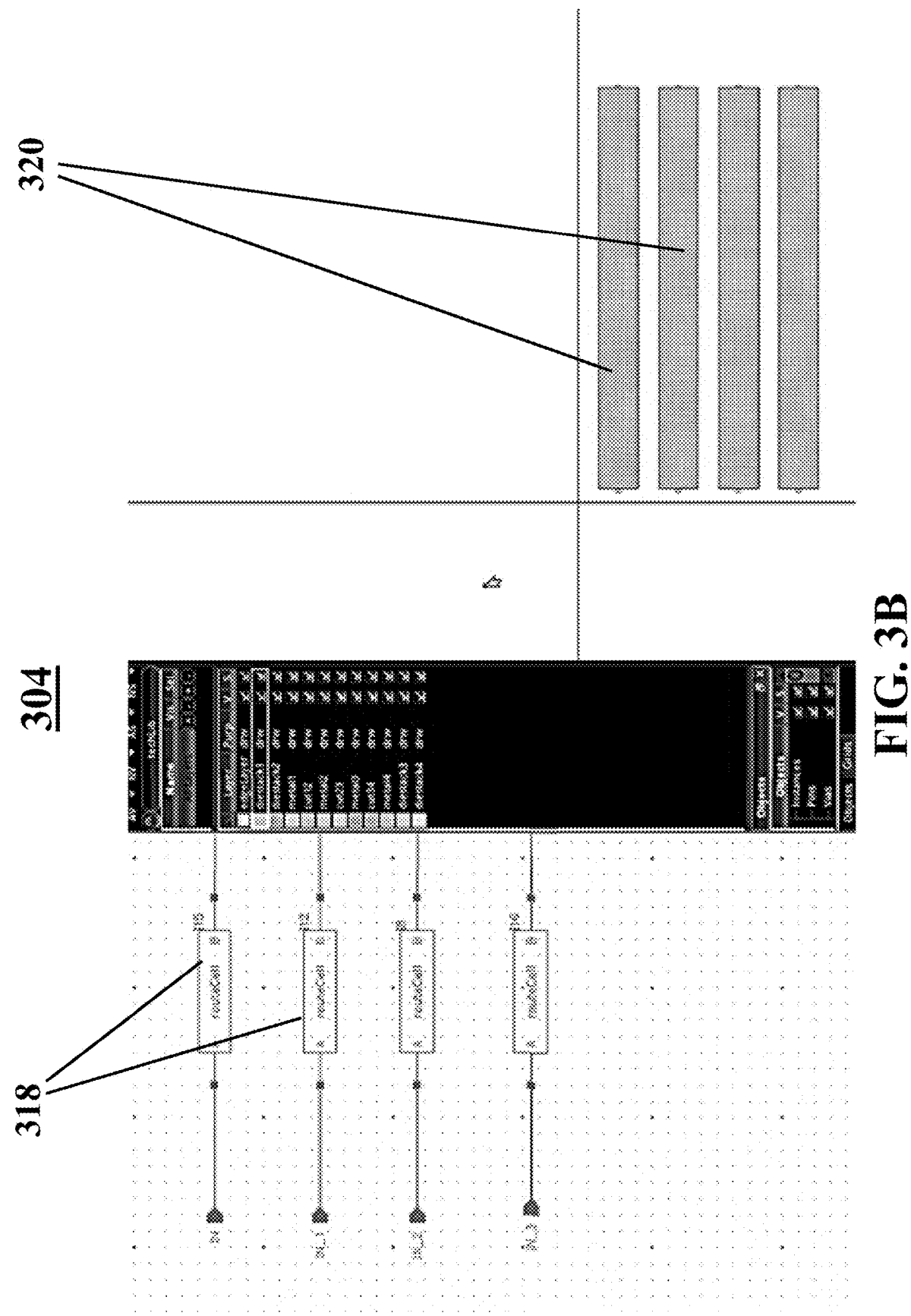
FIG. 3B is a screen display of a graphical user interface (GUI) illustrating a circuit layout of each route level instance of an electronic circuit design, according to an embodiment.

FIG. 3B is a screen display of a graphical user interface 304 illustrating a circuit layout 320 of each route level instance 318 of an electronic circuit design (or an integrated circuit (IC) design). As discussed, a schematic designer may generate and/or execute instructions on a design tool such as a schematic tool to create multiple route cell instances 318 while creating a schematic design of an electronic circuit design. In some embodiments, a command/instruction for creation of the route cell instances 318 can be made through a component of an EDA design tool or can be made through use of an application programming language of the EDA system. The schematic designer may then transit information associated with the multiple route cell instances 318 to a layout designer. In some embodiments, the schematic designer may generate and/or execute commands on a design tool to transit information associated with the multiple route cell instances 318 to a layout designer. In some embodiments, the schematic designer may generate and/or execute commands on a schematic tool to transit information associated with the multiple route cell instances 318 to a layout tool operated by a layout designer. A layout designer may then generate and/or execute instructions on a design tool such as a layout tool to generate a corresponding circuit layout 320 for each of route cell instances 318. In other words, one corresponding circuit layout 320 is created for each component in a schematic design of the electronic circuit design. In some embodiments, a command to create a corresponding circuit layout 320 of each of the route cell instances 318 can be made through a component of an EDA design tool or can be made through use of an application programming language of the EDA system. Upon execution of the command, since there are four route cell instances 318 in a non-limiting example shown in FIG. 3A and FIG. 3B, there is a corresponding circuit layout 320 generated for each of the route cell instances 318 and consequently there are a total of four corresponding circuit layouts 320. Each circuit layout 320 may include one or more transmission lines having one or more transmission line components. Also, within each circuit layout 320, values associated with a length and a width of each transmission line component may be determined according to values of the parameters assigned on a corresponding route cell instance 318. In some embodiments, each route cell instance 318 may have different parameter values. In some embodiments, each route cell instance 318 may have same parameter values.

Figure 3C:
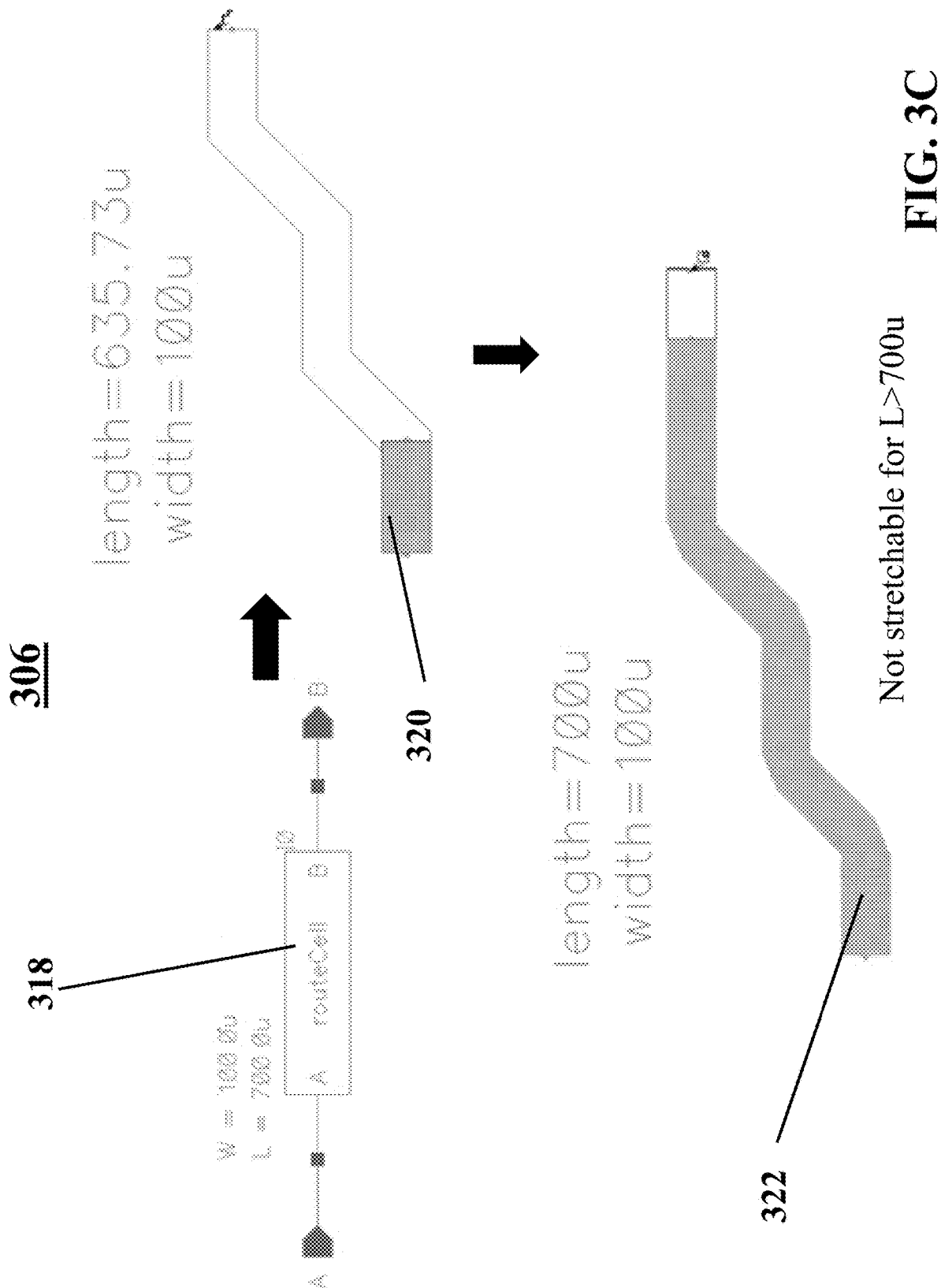
FIG. 3C is a screen display of a graphical user interface (GUI) illustrating modification of a transmission line topology in a circuit layout of an electronic circuit design, according to an embodiment.

FIG. 3C is a screen display of a graphical user interface (GUI) 306 illustrating modification of a transmission line topology in a circuit layout 320 of an electronic circuit design (or an integrated circuit (IC) design). In some embodiments, a layout designer may use a design tool such as a layout tool having a layout editor to modify a transmission line in a circuit layout 320 of the electronic circuit design using layout modifying/editing techniques to create a transmission line topology. While creating the transmission line topology, a layout designer may execute instructions to make a connection between two location points in the circuit layout 320. The layout designer may use a design tool to invoke a modify command on a selected portion of a transmission line in the circuit layout 320, which will enable the modification of the displayed shapes in selection portion of the transmission line of the circuit layout 320. During the modification process of one or more circuit layouts 320, a single electrical or a transmitter component may be converted into multiple routes and bends. For example, during the modification process of the circuit layout 320, a single mlin component in the circuit layout 320 may then be converted to a transmission line route with 5 mlins and 4 mbends (as depicted by reference numeral 320 in FIG. 3C). The transmission line route with 5 mlins and 4 mbends may be a chain of transmission line components to form a transmission line topology. Additionally, during the modification process of the circuit layout 320, where the single mlin component is converted to the transmission line route with the 5 mlins and the 4 mbends, a total length and a total width of a transmission line topology in the circuit layout 320 can't be extended beyond pre-determined limits of the total length and the total width of the transmission line topology in the circuit layout 320. For example, when a maximum limit of a length of a transmission line topology in the circuit layout 320 is set at 700 u (by a schematic designer during a schematic design creation process) and a maximum limit of a width of the transmission line topology in the layout 320 is set at 100 u (by a schematic designer during a schematic design creation process), during the modification process of the circuit layout 320 where the single mlin component is converted to the transmission line route with the 5 mlins and the 4 mbends, the total length and the total width of the transmission line topology in the circuit layout 320 cannot be extended beyond the maximum limit of the length of the transmission line topology at 700 u and the maximum limit of the width of the transmission line topology at 100 u.

Upon conclusion of a modification process of one or more transmission lines in a circuit layout 320 of an electronic circuit design where a layout designer may create a path from a location point A to a location point B in the circuit layout 320 of the electronic circuit design with multiple bends, a code associated with an EDA design tool having a schematic tool and/or a layout tool may take a path from the location point A to the location point B in the circuit layout 320 of the electronic circuit design, and converts the path from the location point A to the location point B in the circuit layout 320 of the electronic circuit design into a series of electrical and/or transmitter components, and subsequently initiate the series of electrical and/or transmitter components with all the connectivity retained between the series of electrical and/or transmitter components and proper connections made between the series of electrical and/or transmitter components. In some embodiments, during the modification process of the one or more transmission lines in the circuit layout 320 of the electronic circuit design, the layout designer may also be able to change transmission line topology in the circuit layout 320 interactively using an EDA design tool. For example, the layout designer may add more electrical and/or transmitter components in the transmission line topology of the circuit layout 320 by abutting new electrical and/or transmitter components the transmission line topology of the circuit layout 320 with the old electrical and/or transmitter components of the transmission line topology in the circuit layout 320.

In operation, there may be multiple transmission lines (such as four transmission lines) associated with a circuit layout 320 of an electronic circuit design, which may be four placeholders. In addition to the four transmission lines associated with the circuit layout 320, the circuit layout 320 may also include existing geometries. When the layout designer generate and execute instructions/commands using an EDA design tool to create routing in each circuit layout 320 of the electronic circuit design, the existing geometries in each circuit layout 320 of the electronic circuit design have to be avoided to ensure that no existing connection in each circuit layout 320 of the electronic circuit design gets short-circuited. In one working case example, a layout designer may execute instructions/commands using an EDA design tool to select one transmission line route in a circuit layout 320 of an electronic circuit design, and then said transmission line route is redrawn based on going around the existing geometry to ensure that no existing connection gets short-circuited.

In embodiments, where new electrical and/or transmitter components may be added into a circuit layout 320 of an electronic circuit design, information associated with the new electrical and/or transmitter components added into the circuit layout 320 of the electronic circuit design is then transmitted back to a schematic designer. For example, during a layout process, when a single transmission line component of a schematic design of the electronic circuit design is converted into multiple transmission line components and bends in a circuit layout 322, the conversion of a single transmission line component into the multiple transmission line components and bends may change electrical characteristics of the electronic circuit design. In such cases, code associated with an EDA design tool (having a schematic tool and/or a layout tool) may back annotate information associated with each and every new electrical and/or transmitter component added into the circuit layout 320 of the electronic circuit design during the layout process into a schematic design. For example, during the back annotation process, a sub master of a route cell is updated with new information associated with each and every new electrical and/or transmitter component added into the circuit layout 320 of the electronic circuit design during the layout design process.

Typically in conventional processes, a circuit designer may have to manually update the schematic design corresponding to the electronic circuit design when a corresponding circuit layout 322 of the electronic circuit design is modified during the layout design process. So in the conventional processes, each time there's a change in the circuit layout 322 of the electronic circuit design, a circuit designer have to manually update a corresponding schematic design of the electronic circuit design, and if all electrical and/or transmitter components information associated with the schematic design is at a top level, then the circuit designer may have to recreate the schematic design by manually moving several old electrical and/or transmitter components in the schematic design to ensure that all electrical and/or transmitter components such as both old electrical and/or transmitter components and new electrical and/or transmitter components are accommodated within the schematic design. Such manual operations performed by a circuit designer are very complex, and therefore implementation of such manual operations is very time-consuming. However, in subject matter disclosed herein in the present disclosure, in various embodiments of a design process, where new electrical and/or transmitter components are added into a circuit layout 322 of an electronic circuit design during a layout design process and/or there is any change in a circuit layout 322 of the electronic circuit design during a layout design process, a code associated with an EDA design tool may back annotate information associated with any new changes in the circuit layout 322 of the electronic circuit design occurring during a layout design process into a corresponding schematic design of the electronic circuit design. During the back annotation process, a super master of a route cell, which may represent a top level of a schematic design corresponding to the electronic circuit design does not change, and only sub masters of the route cell may be updated with any new information associated with any new changes into the circuit layout 322 of the electronic circuit design such as addition of new electrical and/or transmitter components into the circuit layout 322 of the electronic circuit design occurred during the layout design process. Such a synchronization between a layout design process and a schematic design process where any changes occurring on a circuit layout 322 of an electronic circuit design during the layout design process such as addition of new electrical and/or transmitter components into the circuit layout 322 of the electronic circuit design may be updated on a level one hierarchy (a sub master) of a route cell corresponding to a schematic design of the electronic circuit design, and therefore at a time of a creation of a route cell corresponding to a schematic design, a schematic designer doesn't have to worry about placement of all electrical and/or transmitter components on a top level (a super master) of a route cell associated with the schematic design of the electronic circuit design. The synchronization between the layout design process and the schematic design process may further allow creation of several electrical and/or transmitter components and devices at a top level (a super master) of a route cell associated with the schematic design of the electronic circuit design because no changes are being made at a top level (a super master) of a route cell associated with the schematic design of the electronic circuit design when there are any modifications occurring in the circuit layout 322 during the layout design process.

After updating of a level one hierarchy (a sub master) of a route cell associated with a schematic design of an electronic circuit design by a code associated with an EDA design tool in response to any changes in a circuit layout 322 of the electronic circuit design, a schematic designer may then re-simulate updated schematic design of the electronic circuit design using an EDA tool to obtain new parameters corresponding to the updated schematic design of the electronic circuit design. Based on determined values associated with the new parameters corresponding to the updated schematic design of the electronic circuit design, a schematic designer may then determine if any feature/component has to be changed/modified in the updated schematic design of the electronic circuit design. In some alternate embodiments, based on analysis and evaluation of the values associated with the new parameters corresponding to the updated schematic design of the electronic circuit design, a design tool may determine that fine-tuning is required of transmission line components in a circuit layout 322 of an electronic circuit design. The fine-tuning of the transmission line components in the circuit layout 322 of the electronic circuit design may include changing width, length, or angle of bends (degree factor of bends) in the circuit layout 322 of the electronic circuit design, as represented in FIGS. 3D, 3E, and 3F.

Figure 3D:
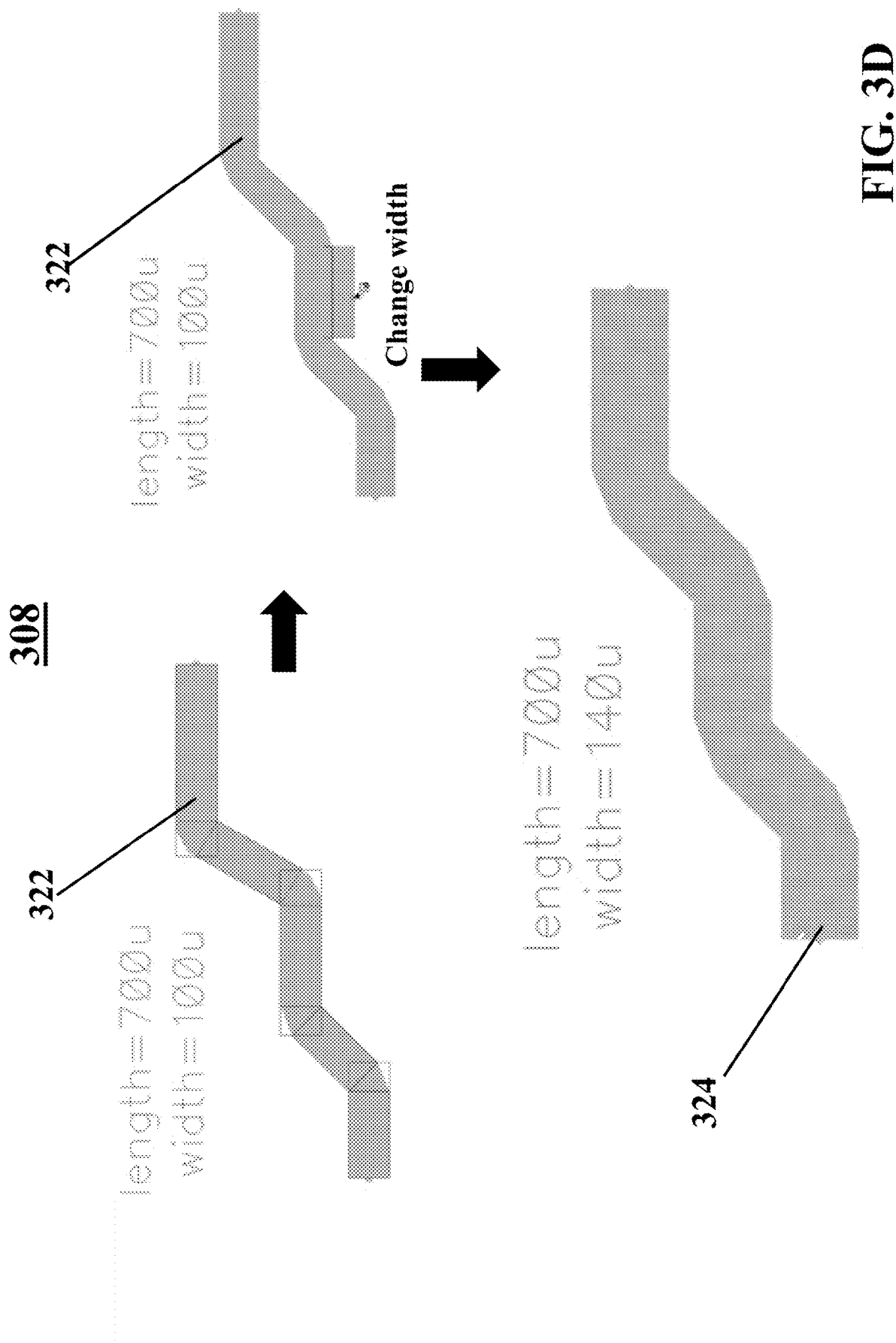
FIG. 3D is a screen display of a graphical user interface (GUI) illustrating modification of a width of a transmission line topology in a circuit layout of an electronic circuit design, according to an embodiment.

FIG. 3D is a screen display 308 of a graphical user interface (GUI) illustrating steps for modification of a width of a transmission line topology in a circuit layout 322 of an electronic circuit design. In order to make the changes in the width of the transmission line components in the circuit layout 322 of the electronic circuit design based on new parameters determined during re-simulation of updated schematic design of the electronic circuit design, a layout designer may use an EDA design tool to generate and execute commands to make changes in a width of the transmission line components in the circuit layout 322 of the electronic circuit design as per the new parameters. Upon execution of the commands on the EDA design tool, when a width is supposed to be changed at a selection portion of the circuit layout 322, the change in the width may be propagated into each component of the transmission line chain to generate a modified circuit layout 324 with an updated width.

Any width changes performed in transmission line components in a circuit layout 322 of the electronic circuit design based on new parameters determined during re-simulation of updated schematic design of the electronic circuit design may contribute to new electrical parameters and impedance of all transmission lines in the circuit layout 322 of the electronic circuit design. In order to make the width modifications in the transmission line components in the circuit layout 322 of the electronic circuit design based on the new parameters determined during re-simulation of updated schematic design of the electronic circuit design, a layout designer may use a design tool to execute commands to modify the width.

Figure 3E:
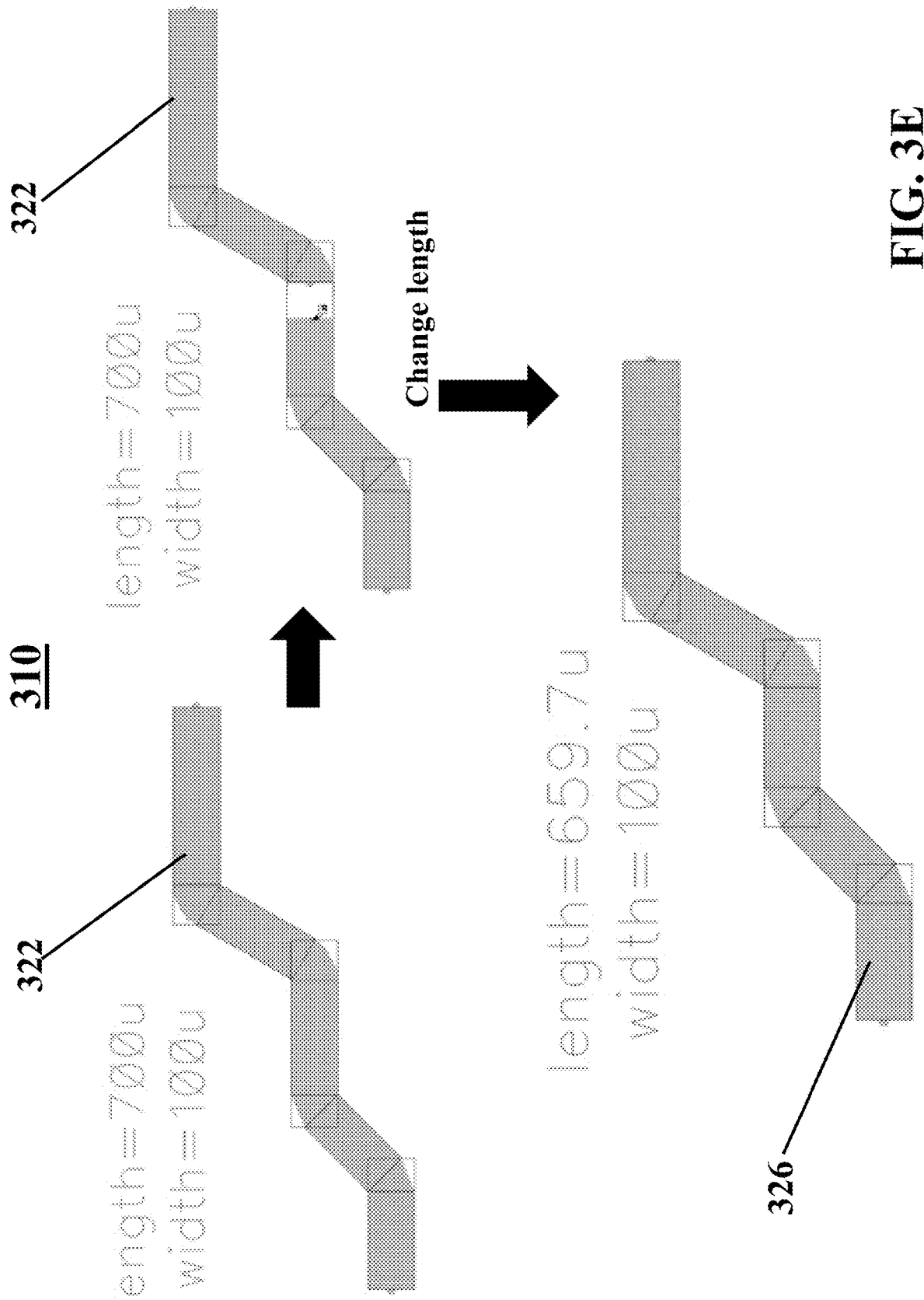
FIG. 3E is a screen display of a graphical user interface (GUI) illustrating modification of a length of a transmission line topology in a circuit layout of an electronic circuit design, according to an embodiment.
Figure 3F:
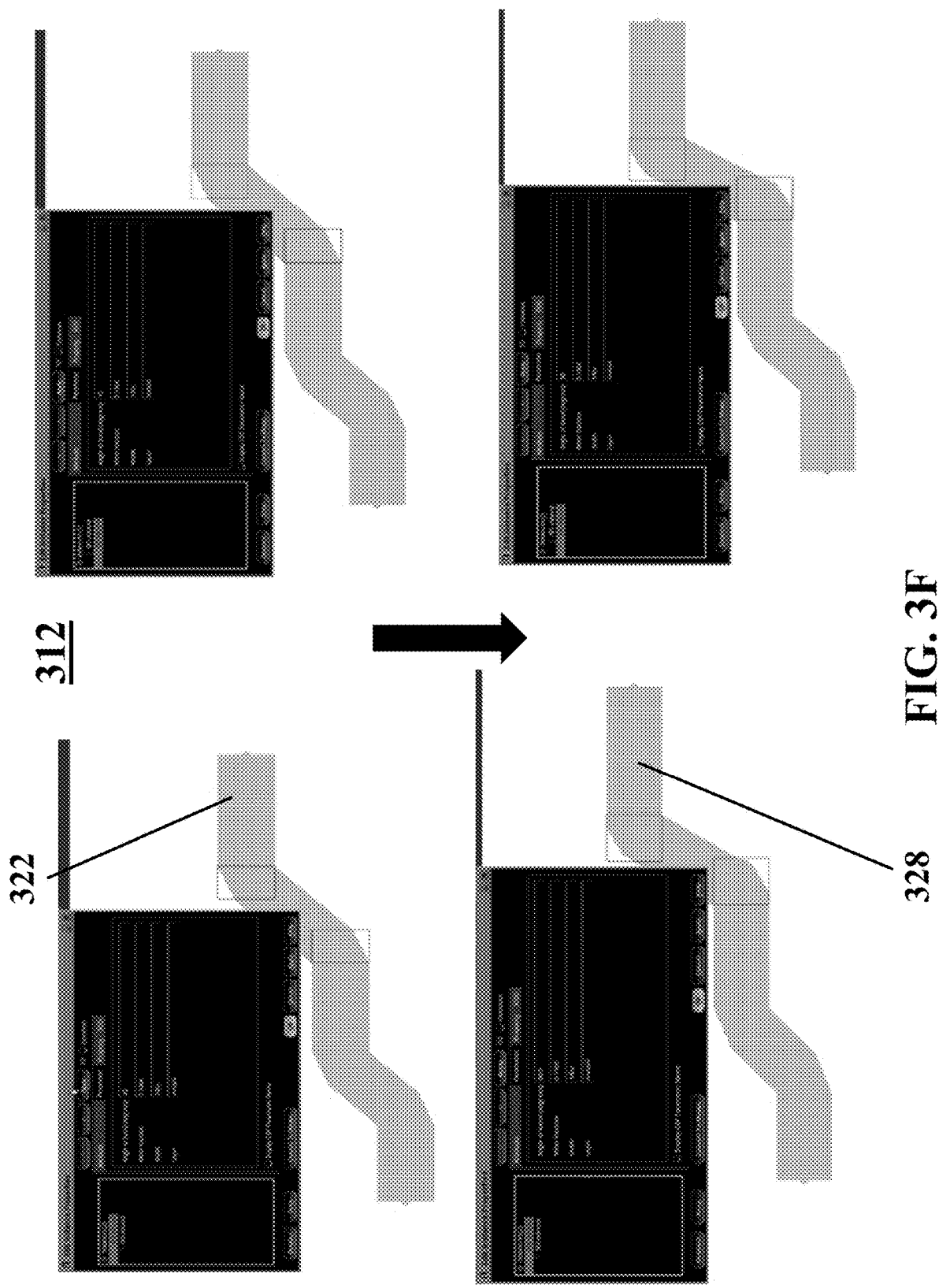
FIG. 3F is a screen display of a graphical user interface (GUI) illustrating steps for modification of an angle of a component in a transmission line topology in a circuit layout of an electronic circuit design, according to an embodiment.

FIG. 3E is a screen display 310 of a graphical user interface (GUI) illustrating steps for modification of a length of a transmission line topology in a circuit layout 322 of an electronic circuit design. In order to make the changes in the length of the transmission line components in the circuit layout 322 of the electronic circuit design based on new parameters determined during re-simulation of updated schematic design of the electronic circuit design, a layout designer may use an EDA design tool to generate and execute commands to make changes in a length of the transmission line components in the circuit layout 322 of the electronic circuit design based on the new parameters. Upon execution of the commands on the EDA design tool, when a length is supposed to be changed at a selection portion of the circuit layout 322, the change in the length may be propagated into each component of the transmission line chain to generate a modified circuit layout 326 with an updated length.

Any length changes performed in transmission line components in a circuit layout 322 of the electronic circuit design based on new parameters determined during re-simulation of updated schematic design of the electronic circuit design may contribute to new electrical parameters and impedance of all transmission lines in the circuit layout 322 of the electronic circuit design. In order to make the length modifications in the transmission line components in the circuit layout 322 of the electronic circuit design based on the new parameters determined during re-simulation of updated schematic design of the electronic circuit design, a layout designer may use a design tool to execute commands to modify the length.

FIG. 3F is a screen display 312 of a graphical user interface (GUI) illustrating steps for modification of an angle of a component of a transmission line topology in a circuit layout 322 of an electronic circuit design. In order to make the changes in the angle of a component of the transmission line components in the circuit layout 322 of the electronic circuit design based on new parameters determined during re-simulation of updated schematic design of the electronic circuit design, a layout designer may use an EDA design tool to generate and execute commands to make changes in an angle of a component of the transmission line components in the circuit layout 322 of the electronic circuit design as per the new parameters. Upon execution of the commands on the EDA design tool, when an angle of a component is supposed to be changed at a selection portion of the circuit layout 322, the change in the angle of one component may adjust an angle of component at other end of a transmission line to generate a modified circuit layout 328 with an updated angle.

Any angle changes performed in transmission line components in a circuit layout 322 of the electronic circuit design based on new parameters determined during re-simulation of updated schematic design of the electronic circuit design may contribute to new electrical parameters and impedance of all transmission lines in the circuit layout 322 of the electronic circuit design. In order to make the angle modifications in the transmission line components in the circuit layout 322 of the electronic circuit design based on the new parameters determined during re-simulation of updated schematic design of the electronic circuit design, a layout designer may use a design tool to execute commands to modify the angle.

In some embodiments, tuning of one or more transmission line components in a circuit layout 322 of an electronic circuit design may also include changing straight bends in the circuit layout 322 of the electronic circuit design into angled bends such as 45-degree bends. Any new changes performed in transmission line components in a circuit layout 322 of the electronic circuit design based on new parameters determined during re-simulation of updated schematic design of the electronic circuit design may contribute to new electrical parameters and impedance of all transmission lines in the circuit layout 322 of the electronic circuit design. In order to make the modifications in the transmission line components in the circuit layout 322 of the electronic circuit design based on the new parameters determined during re-simulation of updated schematic design of the electronic circuit design, a layout designer may use a design tool to execute commands to make the modifications such as changing the angle at bends.

Figure 3G:
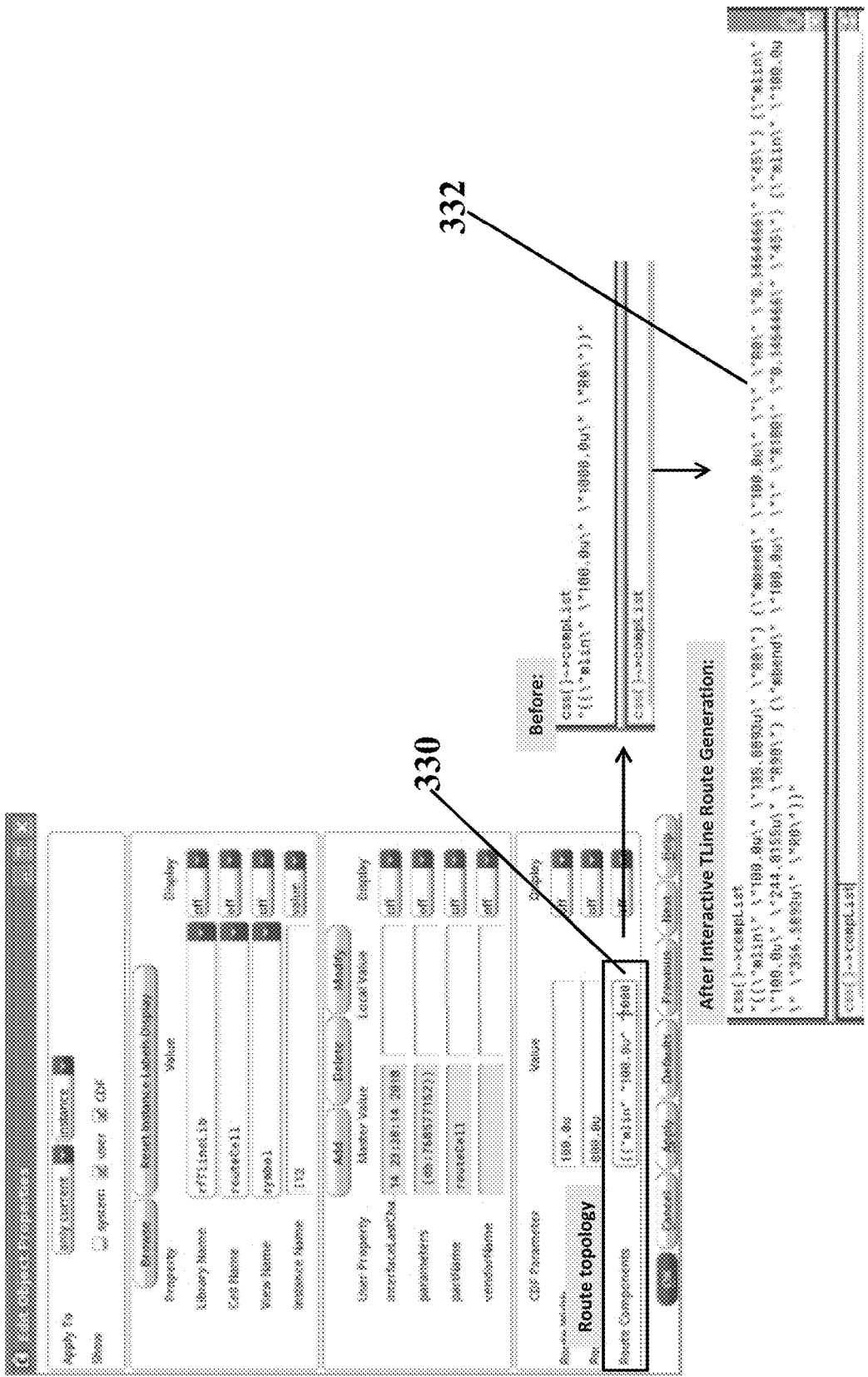
FIG. 3G is a screen display of a graphical user interface (GUI) illustrating back annotation of edits occurred in a circuit layout to a schematic design of an electronic circuit design, according to an embodiment.

FIG. 3G is a screen display 314 of a graphical user interface (GUI) illustrating back annotation of edits/modifications occurred in a circuit layout 322 during a layout design process to a schematic design of an electronic circuit design. Each route cell generated during a schematic design process may have a parameter. The parameter may include information associated with electrical and/or transmitter components of a topology of an electronic circuit design. At a first step 330 in a schematic design process, a single transmission line component may be present, which may have a weight of 100 u, a length of 1000 u, and an orientation set at 0. During a layout design process, when a corresponding circuit layout 322 of the electronic circuit design is updated with new components or otherwise, values of one or more parameters corresponding to a schematic design of the electronic circuit design is also updated by a code associated with a design tool. The updated values of the one or more parameters may then correspond to a series of components represented by 332. The series of components may have multiple limbs and bends.

Figure 3H:
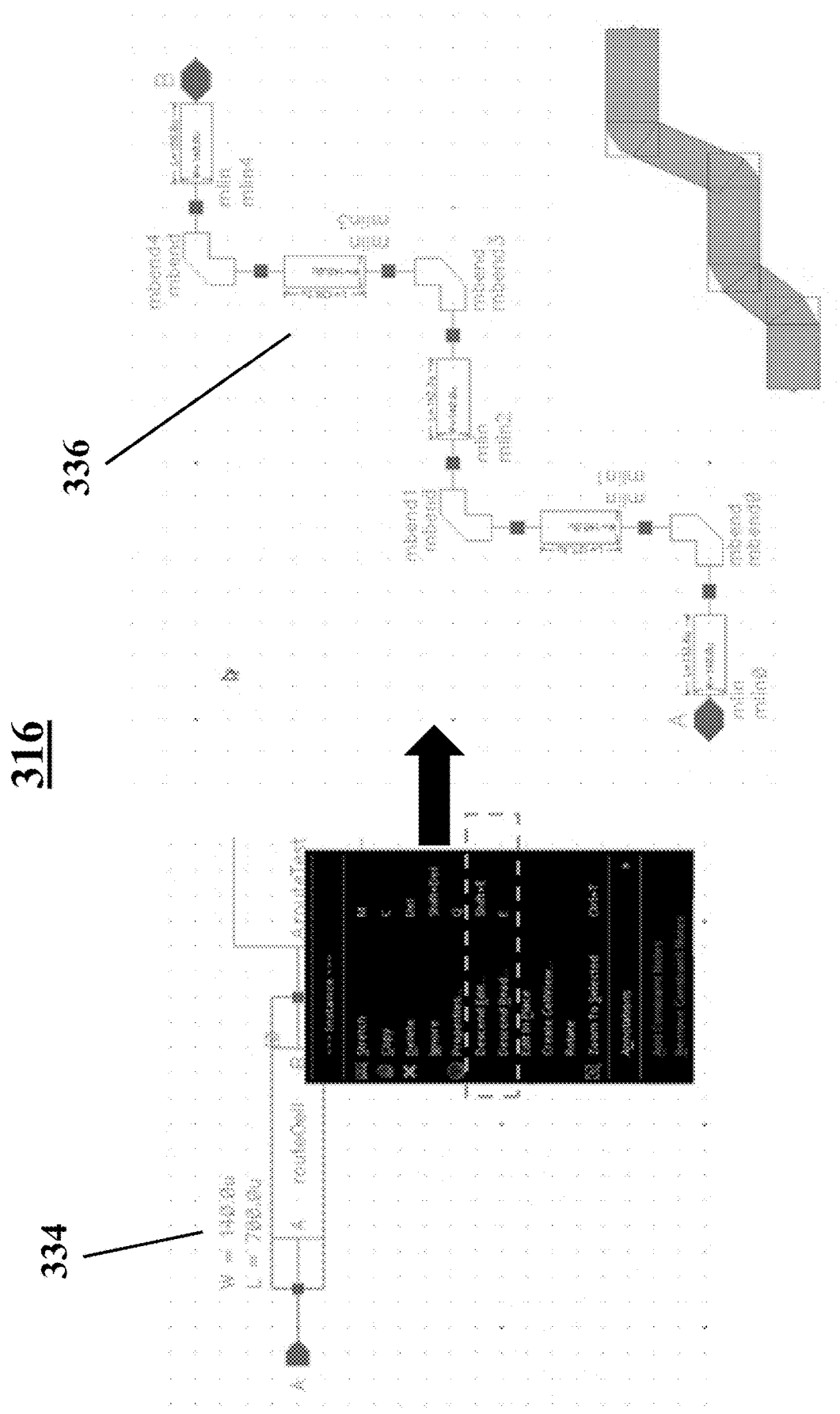
FIG. 3H is a screen display of a graphical user interface (GUI) illustrating back annotation of edits occurred in a circuit layout to a schematic design of an electronic circuit design, according to an embodiment.

FIG. 3H is a screen display 316 of a graphical user interface (GUI). Once a schematic designer execute instructions on a design tool to create a schematic design of an electronic circuit design, the schematic designer may have an initial determination of parameters such as a length of a particular route or a width of a particular route between components in the electronic circuit design. The initial values of the parameters (represented by 334) may be assigned as a hard constraint while interactively changing a topology at a circuit layout 336 of the electronic circuit design. So, at the time of modifying the circuit layout 336 of the electronic circuit design by adding new components or changing parameters of the existing components, a design tool may be inputted of a value of maximum length of a particular route and a value of maximum width of a particular route between components in the electronic circuit design, and as long as the instructions by a layout designer to modify the circuit layout 336 does not violate the hard constrain maximum values of the parameters, the design tool will execute the instructions to modify the circuit layout 336. In other words, a design tool will create a particular route between any two components in the circuit layout 336 such that the specified values of the maximum length of a particular route and a value of maximum width of a particular route is not exceeded.

It should be understood that one or more operations described above with regards to FIGS. 3A-3H may be performed automatically. For instance and without limitation, the design tool may automatically back annotate edits made in a circuit layout to the corresponding schematic design.

Figure 4:
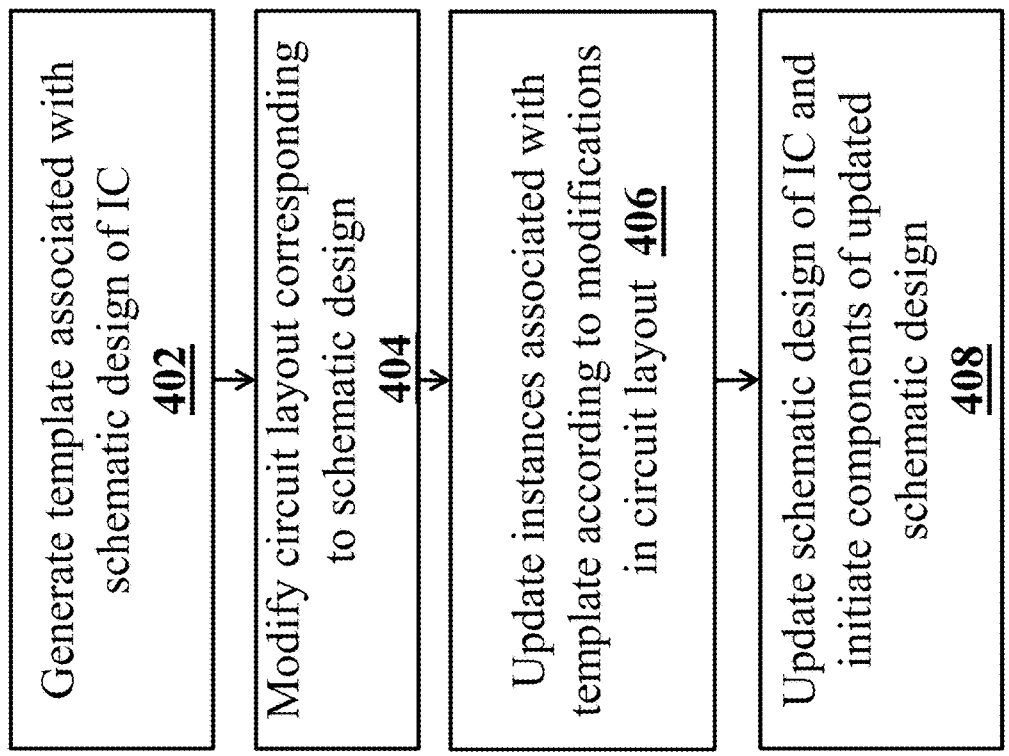
FIG. 4 is a flow diagram illustrating a method of creating and editing an electronic circuit design, according to an embodiment.

FIG. 4 shows an illustrative method 400 of creating and editing an electronic circuit design, according to an embodiment. The method 400 shown in FIG. 4 comprises execution steps 402, 404, 406, and 408. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 400 of FIG. 4 is described as being executed by a single computer. However, in some embodiments, steps may be executed by any number of computing devices operating in a distributed computing environment and having a non-transitory machine-readable media configured to store design data. In some cases, a computer executing one or more steps may be programmed to execute various other, unrelated features such as comprising a user interface to accept instructions from a user and be responsive to at least one instruction from the user, where such computing device does not need to be operating strictly as the computer described herein.

At a first step 402, the computer may access a database and generate a template associated with a schematic design of an IC. In some embodiments, a user may operate a computer having a design tool and a user interface to generate and execute one or more instructions/commands to access the database. The database may store stores design data such as schematic design data and layout design data of various electronic circuits. The design data may also include structural data defining a physical structure of each of one or more transmission line components of an integrated circuit design and logical data including a graphical representation of each of the one or more transmission line components of an integrated circuit design.

Initially, the computer may execute a design tool to simulate and/or initiate an initial version of an integrated circuit design including connections between various transmission line components of the integrated circuit design. In some embodiments, the computer may first execute the design tool to generate a schematic design of an integrated circuit design including logical connections between various transmission line components of the integrated circuit design, and then simulate and/or initiate the schematic design of the integrated circuit design including logical connections between the various transmission line components of the integrated circuit design. Upon successful conclusion of the simulation, the computer may determine one or more initial parameters and values of the one or more initial parameters associated with the transmission line components of the integrated circuit design. The one or more initial parameters and the values of the one or more initial parameters may be associated with connections between various transmission line components from one point location to another point location in the electronic circuit design. In some embodiments, the one or more initial parameters and the values of the one or more initial parameters may be associated with physical dimensions of circuit components of various transmission line components in the electronic circuit design. For example, for each circuit component route cell, parameter values such as length, width, number of gate segments, and/or other design elements of the circuit component may be determined and/or assigned.

The computer may generate a maximum limit for values of each of one or more initial parameters. In other words, the value of each of one or more initial parameters may have a maximum value limit. For example, an initial parameter value such as a length of a circuit component may have a maximum limit of 700 u, which indicates that the length of a circuit component cannot be stretched beyond 700 u. In another example, an initial parameter value such as a width of a circuit component may have a maximum limit of 100 u, which indicates that the width of a circuit component cannot be stretched beyond 100 u.

The computer may generate a record of a template associated with a schematic design corresponding to an integrated circuit design. The template may be a parameterized route and/or a parametrized route cell. The route cell may exist at different levels, namely, a super master, a sub master, and instances. The route cell super master component may be at a top level, with each of the different route cell sub master(s) representing instances of the route cell. The computer may then associate one or more initial parameters and values of the one or more initial parameters corresponding to various transmission line components to the one or more instances. In some embodiments, the computer may assign the one or more initial parameters and the values of the one or more initial parameters corresponding to the various transmission line components to the one or more instances.

At next step 404, the computer may generate a circuit layout corresponding to a schematic design corresponding to an integrated circuit design. In some embodiments, the computer may use the schematic design as well as one or more initial parameters corresponding to schematic design to generate the circuit layout. In some embodiments, the circuit layout may characterize the integrated circuit design in planar geometric shapes. For example, the circuit layout may include geometric representations of integrated circuit design elements, which are to be fabricated on a wafer such as electronic circuit components, and may further include several geometries such as circuit modules, that is, the geometric representations of electronic or circuit components with pins, and interconnect lines, that is, the geometric representations of wiring that connect the pins of the circuit modules on a same layer. The circuit layout may be stored in a non-transitory machine-readable medium storing a layout database, such as but not limited to OpenAccess database. In one example, the circuit layout data format may be a GDS database format.

The circuit layout may also display a depiction of a layout for the integrated circuit design. The layout may be defined by database objects such as transmission line components where each database object is formed on any one of multiple interconnect layers having respective first and second ends. In some embodiments, the circuit layout may be a representation of the integrated circuit design in various circuit layout data formats. The circuit layout data formats may involve a binary format for the representation of planar geometric shapes and text labels.

A circuit designer (such as a layout designer) may access and operate on the circuit layout on a user interface using a design tool. The circuit designer may use the design tool such as a layout editor tool for modifying contents in one or more portions of the circuit layout. The layout editor tool may be an analog layout tool or a digital tool. Using the layout editor tool, the circuit designer may transmit one or more instructions/commands to the computer for modifying contents in the one or more portions of the circuit layout. In response to the one or more instructions/commands from the user interface, a computer may implement and/or execute modifications and/or changes to content in one or more portions of the circuit layout. The modifications and/or changes to the one or more portions of the circuit layout may be associated with addition of new components into the circuit layout. In some embodiments, the modifications and/or changes to the one or more portions of the circuit layout may be associated with changes of geometries and/or parameters associated with existing components of the circuit layout. In some embodiments, the modifications and/or changes to the one or more portions of the circuit layout may be associated with changes to geometries and/or parameters associated with existing components of the circuit layout as well as addition of new components in the circuit layout. The computer may perform any modifications and/or changes in the circuit layout within the maximum limit for values of each of one or more initial parameters associated with the transmission line components of the integrated circuit design. In some embodiments, the computer may decline any instructions/commands received from the user interface to make the modifications and/or the changes in the circuit layout beyond the maximum limit for values of each of the one or more initial parameters associated with the transmission line components of the integrated circuit design.

At next step 406, the computer may update one or more instances associated with a schematic design of an integrated circuit design according to modified contents of one or more transmission line components in a circuit layout. In other words, any modifications and/or changes in the circuit layout causes an update of the one or more instances associated with the schematic design. The computer may then store updated one or more instances in a non-transitory machine-readable storing a database, such as but not limited to OpenAccess database.

At next step 408, the computer may generate a new updated schematic design corresponding to an integrated circuit design in response to updating of one or more instances. The computer may then store new updated schematic design corresponding to the integrated circuit design in a non-transitory machine-readable medium storing a database, such as but not limited to OpenAccess database. Subsequently, the computer may perform simulation and/or initiation of the new updated schematic design to determine one or more new parameters associated with an updated chain of one or more transmission line components in the new updated schematic design because of modifications and/or changes in a circuit layout. Based on analysis and review of the new parameters and values of the new parameters, the computer may then modify the circuit layout, if required. The computer may store the modified circuit layout in a non-transitory machine-readable storing a database, such as but not limited to OpenAccess database.

It should be understood that the computer may perform one or more of the aforementioned steps automatically. For example, at step 406, the computer may automatically update one or more instances associated with a schematic design of an integrated circuit design according to modified contents of one or more transmission line components in a circuit layout. As another example, at step 408, the computer may automatically generate a new updated schematic design corresponding to an integrated circuit design in response to updating of one or more instances. It should further be understood that these examples are non-limiting, and the computer may automate or partially automate other steps as well.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein. One or more operations in the disclosed embodiments may be performed automatically or further automated using, for example, one or more computer processes. For instance, a first operation may trigger a function call to a second operation such that the second operation is performed automatically when the first operation is performed.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    generating, by a computer coupled to a non-transitory machine-readable first storage media hosting a database, a record of a template associated with a schematic design corresponding to an integrated circuit design to be stored in the database, the template having one or more instances corresponding to one or more initial parameters associated with a chain of one or more transmission line components of the integrated circuit design, the one or more initial parameters having a maximum value limit;
    in response to one or more instructions received on a user interface,
        modifying, by the computer, structural data defining a physical structure of a circuit layout corresponding to the schematic design within the maximum range limit of the one or more initial parameters, the circuit layout modified to include one or more new transmission line components to the chain of transmission line components;
        storing, into a second storage media, the modified circuit layout; and
        modifying the schematic design from the modified circuit layout by updating, by the computer, logical data in the record of the template associated with the schematic design to include the structural data defining the physical structure of the modified circuit layout that includes the one or more new transmission line components in the circuit layout.

2. The computer-implemented method of claim 1, further comprising:
generating, by the computer, a new updated schematic design corresponding to the integrated circuit design in response to updating of the one or more instances.

3. The computer-implemented method of claim 2, further comprising:
simulating, by the computer, the new updated schematic design to determine one or more new parameters associated with an updated chain of one or more transmission line components represented in the new updated schematic design.

4. The computer-implemented method of claim 3, further comprising:
modifying, by the computer, the circuit layout in response to the one or more new parameters.

5. The computer-implemented method of claim 1, further comprising:
simulating, by the computer, the integrated circuit design to determine the one or more initial parameters.

6. The computer-implemented method of claim 1, further comprising:
generating, by the computer, the circuit layout corresponding to the schematic design associated with the integrated circuit design.

7. The computer-implemented method of claim 6, wherein the circuit layout displays a depiction of a layout for the integrated circuit design, and wherein the layout is defined by database objects where each database object is formed on any one of multiple interconnect layers having respective first and second ends.

8. The computer-implemented method of claim 1, wherein the template is a parametrized route cell comprising a super master, a sub master, and the one or more instances.

9. The computer-implemented method of claim 1, further comprising:
assigning, by the computer, the one or more initial parameters corresponding to the one or more transmission line components to the one or more instances.

10. The computer-implemented method of claim 1, wherein the database stores design data comprising structural data defining a physical structure of each of the one or more transmission line components and logical data including a graphical representation of each of the one or more transmission line components.

11. A system, comprising:
one or more computers comprising a non-transitory machine-readable first storage media hosting a database configured to store design data of an integrated circuit design;
at least one computer of the one or more computers coupled to the non-transitory machine-readable media storing the design data and comprising a processor configured to:
generate a record of a template associated with a schematic design corresponding to the integrated circuit design to be stored in the database, the template having one or more instances corresponding to one or more initial parameters associated with a chain of one or more transmission line components of the integrated circuit design, the one or more initial parameters having a maximum value limit;
in response to one or more instructions received from a user interface,
modify structural data defining a physical structure of a circuit layout corresponding to the schematic design within the maximum range limit of the one or more initial parameters, the circuit layout modified to include one or more new transmission line components to the chain of transmission line components;
store the modified circuit layout into a second storage media; and
update the record of the template associated with the schematic design to include the modified circuit layout that includes the one or more new transmission line components in the circuit layout.

12. The system of claim 11, wherein the processor is further configured to:
generate a new updated schematic design corresponding to the integrated circuit design in response to updating of the one or more instances.

13. The system of claim 12, wherein the processor is further configured to:
simulate the new updated schematic design to determine one or more new parameters associated with an updated chain of one or more transmission line components represented in the new updated schematic design.

14. The system of claim 13, wherein the processor is further configured to: modify the circuit layout in response to the one or more new parameters.

15. The system of claim 11, wherein the processor is further configured to:
simulate the integrated circuit design to determine the one or more initial parameters.

16. The system of claim 11, wherein the processor is further configured to:
generate the circuit layout corresponding to the schematic design associated with the integrated circuit design.

17. The system of claim 16, wherein the circuit layout displays a depiction of a layout for the integrated circuit design, and wherein the layout is defined by database objects where each database object is formed on any one of multiple interconnect layers having respective first and second ends.

18. The system of claim 11, wherein the template is a parametrized route cell comprising a super master, a sub master, and the one or more instances.

19. The system of claim 11, wherein the processor is further configured to:
assign the one or more initial parameters corresponding to the one or more transmission line components to the one or more instances.

20. The system of claim 11, wherein the design data comprises structural data defining a physical structure of each of the one or more transmission line components and logical data including a graphical representation of each of the one or more transmission line components.

* * * * *